Jan. 20, 1970 R. J. HARRISON 3,490,092
CHICKEN KILLING APPARATUS
Filed July 14, 1967 3 Sheets-Sheet 1
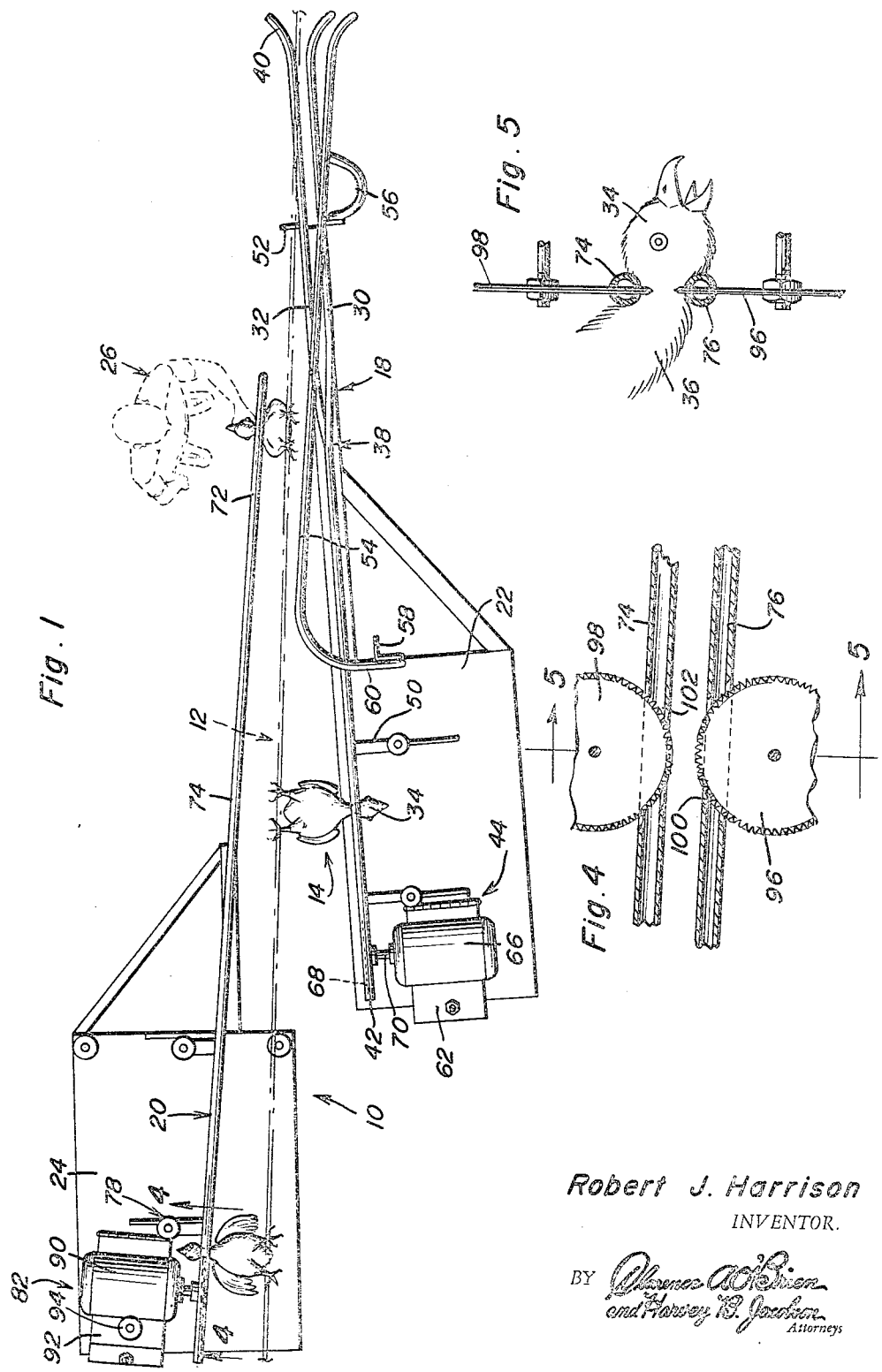
Robert J. Harrison
INVENTOR.

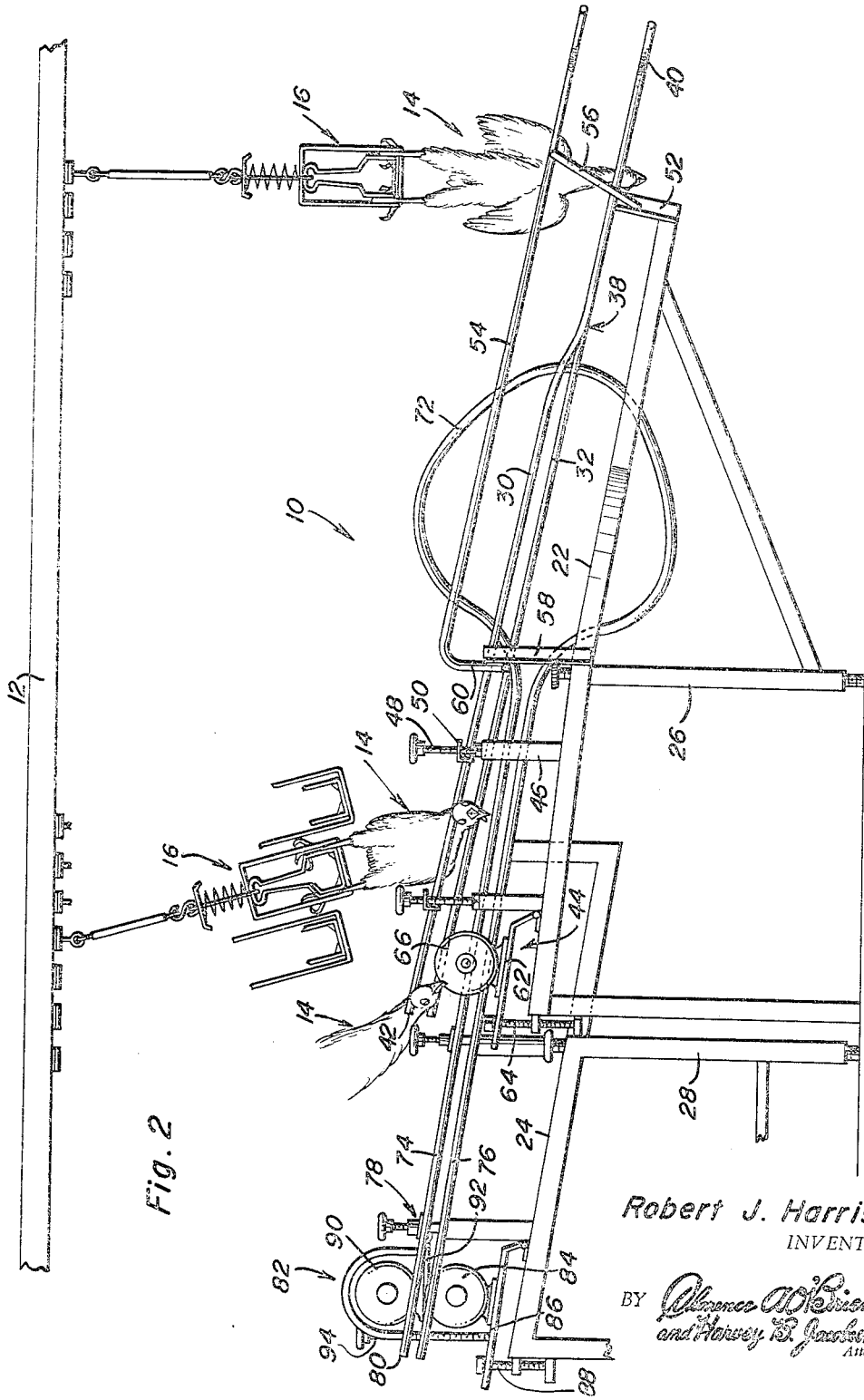

Robert J. Harrison
INVENTOR.

United States Patent Office 3,490,092
Patented Jan. 20, 1970

3,490,092
CHICKEN KILLING APPARATUS
Robert J. Harrison, Knoxville, Tenn.
(308 Circle Drive, Gatlinburg, Tenn. 37738)
Filed July 14, 1967, Ser. No. 653,422
Int. Cl. A22b 3/08
U.S. Cl. 17—11
16 Claims

ABSTRACT OF THE DISCLOSURE

An apparatus associated with overhead conveyors from which leg shackles suspend poultry for rapid slaughter in a precise manner by severing only the jugular and cross arteries in the neck of the birds. This is accomplished by guiding movement of the fowl with the neck held between vertically spaced rods into which a rotating cutter blade projects adjacent the exit ends of the rods from which the birds are withdrawn by the conveyor.

---

This invention relates to apparatus for production slaughtering of poultry such as chickens and turkeys.

The slaughter of poultry requires special handling so as to avoid body damage to the bird other than the cutting of the jugular and cross arteries in the neck for drainage of blood. In view thereof, special problems arise in order to properly slaughter the poultry on a rapid production basis.

Apparatus heretofore proposed for automatic or semi-automatic slaughter of poultry was extremely complicated and not sufficiently rapid in operation to justify the equipment involved. Furthermore, such equipment required complete re-design of all of the production handling facilities normally present in a poultry slaughter house. Nevertheless, a need for more efficient slaughter of poultry exists not only to insure proper slaughtering procedure, but to also reduce the amount of skilled labor otherwise required.

In accordance with the present invention, apparatus is provided which cooperates with the usual overhead conveyor from which poultry such as chickens are suspended by leg shackles. The apparatus includes a stationary guide bar assembly arranged to receive the neck portion of each chicken, twisting the neck portion into position as it is pulled by the conveyor into the path of a rotating cutter blade projecting by a precise amount through the lowermost guide bar adjacent its exit end from which the chicken is withdrawn by the conveyor. An auxiliary guide bar assembly is also provided with its inlet end spaced from the inlet end of the primary guide bar assembly in the direction of conveyor movement so that any poultry which has somehow avoided the primary guide bar assembly may be manually placed in the auxiliary guide bar assembly to have its neck portion cut by a pair of cutter blades projecting through the guide bars adjacent the exit ends. The guide bar assemblies are disposed below the conveyor on opposite lateral sides thereof at acute angles to the path along which the poultry is conveyed in order to properly position the neck portions of the poultry as they approach the rotating cutter blades aforementioned. Although most of the birds are automatically received and drawn through the primary guide bar assembly, the rest of them may be manually placed in the auxiliary guide bar assembly for slaughter. Thus, the handling of poultry for slaughtering purposes may be effected on a production basis and at a relatively rapid rate.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the apparatus associated with the present invention.

FIGURE 2 is a side elevational view of the apparatus shown in FIGURE 1.

FIGURE 4 is an enlarged partial sectional view taken substantially through a plane indicated by section line 4—4 in FIGURE 1.

FIGURE 5 is a partial transverse sectional view taken substantially through a plane indicated by section line 5—5 in FIGURE 4.

Figure 6:
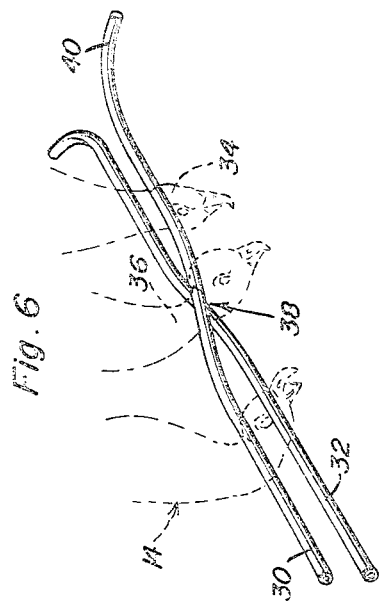
FIGURE 6 is a partial perspective view showing a portion of the apparatus.
Figure 7:
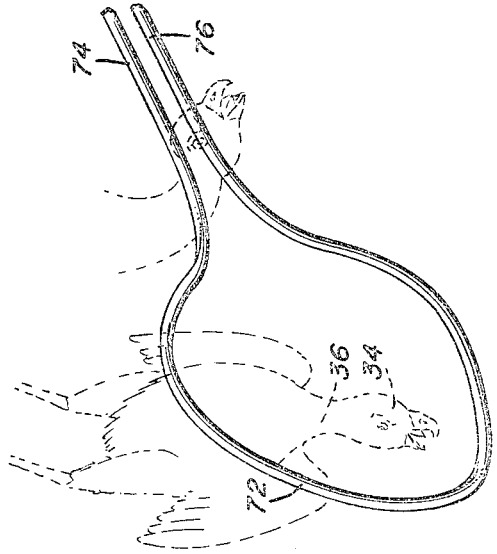
FIGURE 7 is a partial perspective view showing another portion of the apparatus.
Figure 3:
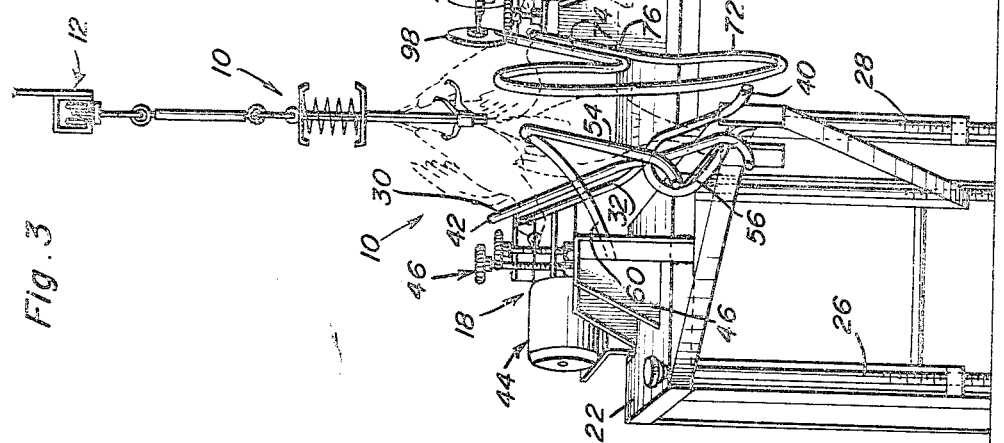
FIGURE 3 is a front elevational view of the apparatus.

Referring now to the drawings in detail, the poultry slaughtering apparatus generally referred to by reference numeral 10 in FIGURES 1, 2 and 3 is associated with an overhead conveyor 12 of a conventional type utilized in poultry slaughter houses from which chickens 14, for example, may be suspended by leg shackle assemblies 16 of a well-known type. Thus, the apparatus 10 is operatively positioned below the overhead conveyor 12 so that the chickens 14 may be processed on a production basis as they are conveyed along a predetermined path by the conveyor 12 in longitudinally spaced relation to each other.

The apparatus includes a pair of stationary guide assemblies including a primary guide assembly 18 and an auxiliary guide assembly 20 respectively supported in stationary positions above the floor by the supporting tables 22 and 24. Most of the chickens are automatically received within the guide assembly 18 as they are moved by the conveyor 12 in a left hand direction as viewed in FIGURES 1 and 2. On occasion, however, some of the chickens may not be received within the primary guide assembly in which case, they are manually placed into the auxiliary assembly by an attendant 26. Thus, the auxiliary guide assembly 20 is spaced forwardly from the primary guide assembly in the direction of conveyor movement and on the opposite lateral side thereof from the primary guide assembly. Also, the supporting surfaces of the tables 22 and 24 are inclined upwardly in the direction of conveyor movement so as to generally support the guide assemblies at an upward inclination. Adjustably extensible legs 26 and 28 are therefore associated with the tables.

The primary guide bar assembly 18 includes a pair of tubular guide rods 30 and 32 that are spaced apart from each other throughout a distance which is less than the width of the heads 34 of the chickens 14 but sufficient to receive the neck portions 36 therebetween. The guide rods are twisted intermediate the ends thereof by approximately 90° at an intermediate location 38. Rearwardly of the location 38 in the direction of conveyor movement, the guide rods are spaced apart horizontally while forwardly of the location 38, the guide rods are spaced apart from each other vertically. It will become apparent therefore that a chicken vertically suspended from the conveyor 12 will be received between the horizontally spaced guide rods 30 and 32 and after passing the location 38, the head 34 will be folded to a horizontal position between the guide rods which are then vertically spaced. Thus, the guide rods 30 and 32 are arranged to receive the neck portions 36 of the chickens therebetween and then by twisting the neck portions by approximately 90°, continue to guide movement of the chickens with the neck portion in proper position for slaughtering purposes.

The guide rods 30 and 32 are provided with outwardly flaring extensions 40 at the receiving end of the guide assembly vertically aligned below the conveyor 12 so as to guide reception of the neck portion of the birds between the horizontally spaced guide rods 30 and 32. As shown in FIGURE 1, the guide rods 30 and 32 also extend laterally away from the conveyor in the direction of conveyor movement at an acute angle so that as the chicken is pulled toward the exit ends 42 of the guide rods, they will be gradually immobilized and the head portion horizontally orientated before being acted upon by the cutter assembly 44. The guide rods are also supported at an adjustable upward incline in the direction of conveyor movement by means of a pair of adjustable supporting brackets 46 mounted on the table 22. Each supporting bracket is accordingly provided with an adjustment screw member 48 threadedly received through an angle element 50 secured as by welding to the uppermost guide rod 30, both guide rods being secured in horizontally spaced relation to each other at the lower end of the table by the support bracket 52.

Also associated with the primary guide bar assembly 18, is a stationary positioning bar 54 that extends from the receiving end of the guide bars forwardly in the direction of conveyor movement to a location spaced from the exit ends 42 forwardly beyond the twisting location 38. The positioning bar 54 is laterally spaced from the conveyor and is mounted in a fixed position above the guide rods 30 and 32 by means of the curved supporting rod 56 adjacent the receiving end and the angle bar 58 to which a curved rear end 60 is welded. The positioning bar 54 is operative by engaging the body of the chicken to partially restrain the same as it is being twisted by the guide rods 30 and 32 approaching and departing from the twisting location 38. Accordingly, the positioning bar 54 is vertically spaced above but extends at an angle to the guide rods as shown in FIGURE 1.

The cutter assembly 44 is mounted on the table 22 adjacent the exit ends 42 of the guide rods by means of a pivoted support 62, the position of which is adjusted by the adjusting screw 64 so as to accurately position electric motor 66 having an output shaft 70 rotating about an axis extending perpendicular to and spaced below the lowermost guide rod 32. A circular cutting saw blade 68 is secured to the shaft 70 as shown by dotted line in FIGURE 1 and extends upwardly through a slot in the lowermost guide rod 32 by a precise amount similar to the projection of saw balde 96 through guide rod 76 hereafter described in connection with FIGURE 4, so as to cut the necks of the chickens between the guide rods to a depth sufficient to cut the jugular and cross arteries.

On occasion, a chicken being conveyed by the overhead conveyor 12, will by its movement avoid the receiving ends 40 of the guide rods associated with the primary guide assembly 18. In such case, the attendant 26 will pull the head portion 34 of the chicken into the receiving loop formation 72 connected to the vertically spaced guide rods 74 and 76 of the auxiliary guide assembly 20. The guide rods 74 and 76 are supported at an adjusted upward incline on the table 24 by means of adjustable supports 78 similar to those associated with the primary guide assembly diverging at an acute angle to the path of conveyor 12 as shown in FIGURE 1. The guide rods 74 and 76 are however vertically spaced throughout from the receiving loop formation to the exit ends 80 from which the neck portion of the chicken is withdrawn after it is inserted between the guide rods at the receiving end by the attendant. As the neck portion of a chicken approaches the exit ends the neck portion is operated on by the cutter assembly 82. The cutter assembly 82 like the cutter assembly 44 associated with the primary guide assembly 18, includes an electric motor 84 mounted on a pivoted support 86 having an adjustment screw device 88 associated therewith. While the motor 84 is mounted below the lowermost guide rod 76, a second motor 90 is adjustably mounted by a pivotal support 92 and adjustment screw 94 above the uppermost guide rod 74. The motors 84 and 90 respectively mount and rotate circular cutter blades 96 and 98 as more clearly seen in FIGURE 4. The cutter blades extend vertically through slots 100 and 102 into the space between the guide rods so as to cut the neck portion 36 of a chicken to the proper depth as more clearly seen in FIGURE 5.

To properly position or orientate the neck portion of the chicken, its head portion must extend horizontally between vertically spaced guide rods laterally diverging from the conveyor while it is drawn by the conveyor from which it is suspended toward the exit ends of the guide rods. In view of this lateral divergence of the guide rods, they are upwardly inclined to avoid stretching of the neck portion. The cutter assembly by projecting vertically through a slot in the lowermost guide rod, will sever the appropriate arteries within the neck portion in order to effect bleeding and drainage of blood from the animal without any other damage thereto. The primary guide rod assembly is utilized to automatically receive the neck portion of each chicken by presenting the guide rods in horizontally spaced relation to each other underlying the conveyor. Once the neck portion is received between the horizontally spaced guide rods, they guide the neck portion to a twisting location 38 at which the guide rods are turned 90° to a vertically spaced relationship necessary to properly orientate the neck portion relative to the cutter assembly. The positioning bar 54 is provided in order to guide movement of the body during twisting of the neck portion. In the event a chicken is not received between the receiving ends of the guide rods associated with the primary guide assembly, an attendant may manually insert the head portion of the chicken between the vertically spaced guide rods 74 and 76 in the auxiliary guide assembly located on the other lateral side of the conveyor and spaced forwardly in the direction of conveyor movement. The use of an additional upper power cutter blade for the cutter assembly 82 will insure proper slaughtering of the chicken processed through the auxiliary guide assembly.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to.

What is claimed as new is as follows:

1. In combination with a moving conveyor adapted to convey poultry suspended therefrom along a predetermined path, poultry slaughtering apparatus including guide means mounted in operative relation to said predetermined path adapted to engage and guide movement of the poultry suspended from the conveyor, means mounting the guide means vertically spaced below the conveyor and laterally thereof at an acute angle to said predetermined path to orientate the neck portion of the poultry, and power operated cutter means projecting into the guide means by a predetermined amount adapted to partially sever the orientated neck portion of the poultry.

2. The combination of claim 1 wherein said guide means includes a pair of spaced guide rods having exit end portions.

3. The combination of claim 2 wherein said guide rods being spaced apart a distance throughout less than the width of poultry heads but sufficient to receive the neck portions therebetween, said exit end portions of the guide rods being vertically spaced from each other laterally of the predetermined path, the lowermost guide rod at the exit end portion having a slot through which the cutter means extends upwardly.

4. The combination of claim 3 wherein said guide means further includes receiving means connected to the guide rods from which the guide rods are inclined upwardly in the direction in which the conveyor is moving, the receiving means including portions spaced apart a distance greater than the spacing between said guide rods.

5. The combination of claim 4 wherein said receiving means comprises extensions of said guide rods extending laterally from opposite sides of the predetermined path below the conveyor.

6. The combination of claim 5 including a positioning bar fixedly mounted above the guide means laterally spaced from the predetermined path at an angle to the guide means adapted to fold the neck portions of poultry above the guide means.

7. The combination of claim 6 wherein said guide rods are twisted approximately 90° from vertically spaced alignment with each other to horizontally spaced alignment intermediate the exit end portions and the receiving means.

8. The combination of claim 2 including receiving means connected to the guide rods from which the guide rods are inclined upwardly in the direction in which the conveyor is moving, the receiving means including portions spaced apart a distance greater than the spacing between said guide rods.

9. The combination of claim 8 wherein said receiving means comprises a loop formation connected to the guide rods substantially in a vertical plane closely spaced laterally of said predetermined path.

10. In combination with a moving conveyor adapted to convey poultry suspended therefrom along a predetermined path, poultry slaughtering apparatus including stationary guide means mounted in operative relation to said predetermined path adapted to receive and guide movement of the poultry suspended from the conveyor, power operated cutter means projecting into the guide means by a predetermined amount adapted to sever blood vessels in the neck portion of the poultry, and a positioning bar fixedly mounted above the guide means laterally spaced from the predetermined path at an angle to the guide means adapted to fold the neck portion of poultry above the guide means.

11. The combination of claim 10 wherein said slaughtering apparatus further includes auxiliary guide means laterally spaced from the predetermined path on a side opposite the first mentioned guide means and forwardly spaced therefrom in the direction of movement of the conveyor.

12. In combination with a moving conveyor adapted to convey poultry suspended therefrom along a predetermined path, poultry slaughtering apparatus including stationary guide means mounted in operative relation to said predetermined path adapted to receive and guide movement of the poultry suspended from the conveyor, and power operated cutter means projecting into the guide means by a predetermined amount adapted to sever blood vessels in the neck portion of the poultry, said slaughtering apparatus further including auxiliary guide means laterally spaced from the predetermined path on a side opposite the first mentioned guide means and forwardly spaced therefrom in the direction of movement of the conveyor.

13. The combination of claim 12 wherein each of said guide means includes a pair of spaced guide rods extending laterally at an acute angle to the direction in which the conveyor is moving and having exist end portions, said guide rods being spaced apart a distance throughout less than the width of poultry heads but sufficient to receive the neck portions therebetween, said exist end portions of the guide rods being vertically spaced from each other laterally of the predetermined path, the lowermost guide rod at the exit end portion having a slot through which the cutter means extends upwardly.

14. The combination of claim 13 wherein the receiving means for the first mentioned guide means comprises extensions of said guide rods extending laterally from opposite sides of the predetermined path below the conveyor, and the receiving means for the auxiliary guide means comprising a loop formation connected to the guide rods substantially in a vertical plane closely spaced laterally of said predetermined path.

15. The combination of claim 14 wherein the cutter means includes rotating saw blades projecting vertically through the guide rods at the exit end portions thereof.

16. In combination with a moving conveyor from which a bird is suspended by the legs for movement along a predetermined path, slaughtering apparatus comprising a primary guide assembly fixedly mounted below the conveyor extending laterally from one side of said predetermined path, a secondary guide assembly spaced laterally of said predetermined path on the other side thereof opposite the primary guide assembly, each of said guide assemblies having receiving and exit ends longitudinally spaced from each other in the direction of conveyor movement, the receiving end of the primary guide assembly being vertically aligned below the conveyor intersecting said predetermined path to automatically receive the bird, said primary guide assemby including folding guide rods interconnecting the receiving and exit ends thereof and a positioning bar vertically spaced above the guide rods at a horizontal angle thereto extending from the receiving end toward a location spaced from the exit end, and rotatable cutter means projecting vertically through the guide assemblies adjacent the exit ends.

References Cited

UNITED STATES PATENTS

| | | | |
|---|---|---|---|
| 2,306,773 | 12/1942 | Biffinger | 17—11 |
| 2,855,624 | 10/1958 | Jerome et al. | 17—11 |
| 3,017,660 | 1/1962 | Reeves | 17—12 |
| 3,038,197 | 6/1962 | Turner | 17—11 |
| 3,213,488 | 10/1965 | Volpe | 17—11 |

LUCIE H. LAUDENSLAGER, Primary Examiner

U.S. Cl. X.R.

17—12